Aug. 10, 1937.　　　W. L. DE BAUFRE　　　2,089,543

METHOD AND APPARATUS FOR SEPARATION OF GASEOUS MIXTURES

Filed Aug. 3, 1934

William Lane de Baufre
INVENTOR

Patented Aug. 10, 1937

2,089,543

UNITED STATES PATENT OFFICE 2,089,543

METHOD AND APPARATUS FOR SEPARATION OF GASEOUS MIXTURES

William Lane De Baufre, Lincoln, Nebr.

Application August 3, 1934, Serial No. 738,181

13 Claims. (Cl. 62—175.5)

This invention relates to improvements in the art of separating mixed gases by rectification, being specially useful in the separation of atmospheric air into more or less pure oxygen and nitrogen and particularly applicable to the apparatus shown and described in United States Patent Nos. 1,951,183, 1,951,184 and 1,951,185, issued March 13, 1934.

The primary object of the invention is to increase the purity of the products of rectification so that in the rectification of atmospheric air, for example, the purity of either the oxygen or the nitrogen or of both products of rectification, is increased. Thus, a higher purity product may be obtained for a given purpose or an increased yield may be obtained of a product of given purity.

More specifically, the invention has to do with providing larger refluxes in a rectifying column for separating gaseous mixtures whereby the efficiency of rectification is improved with a given type and size of column.

Figure 1:
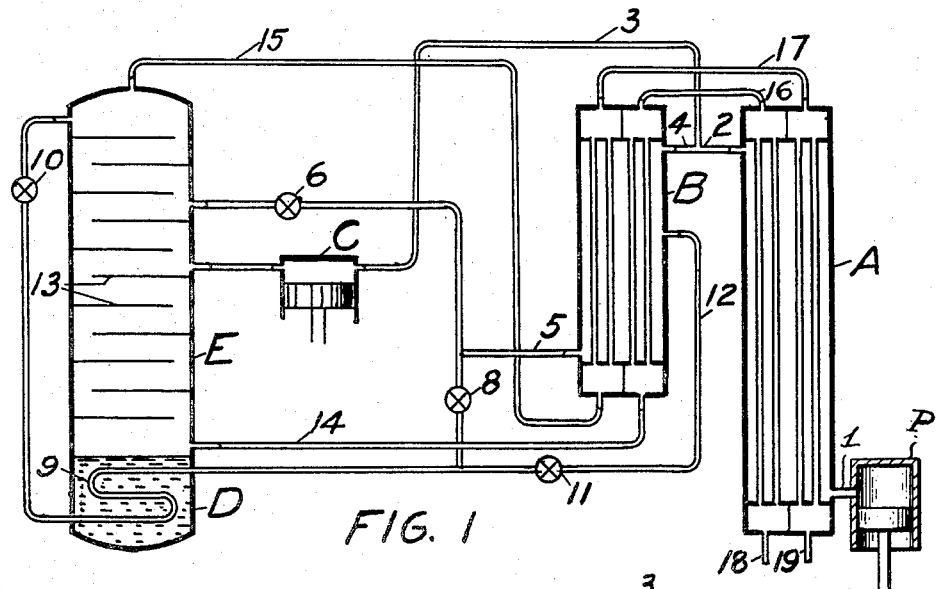
Figure 2:
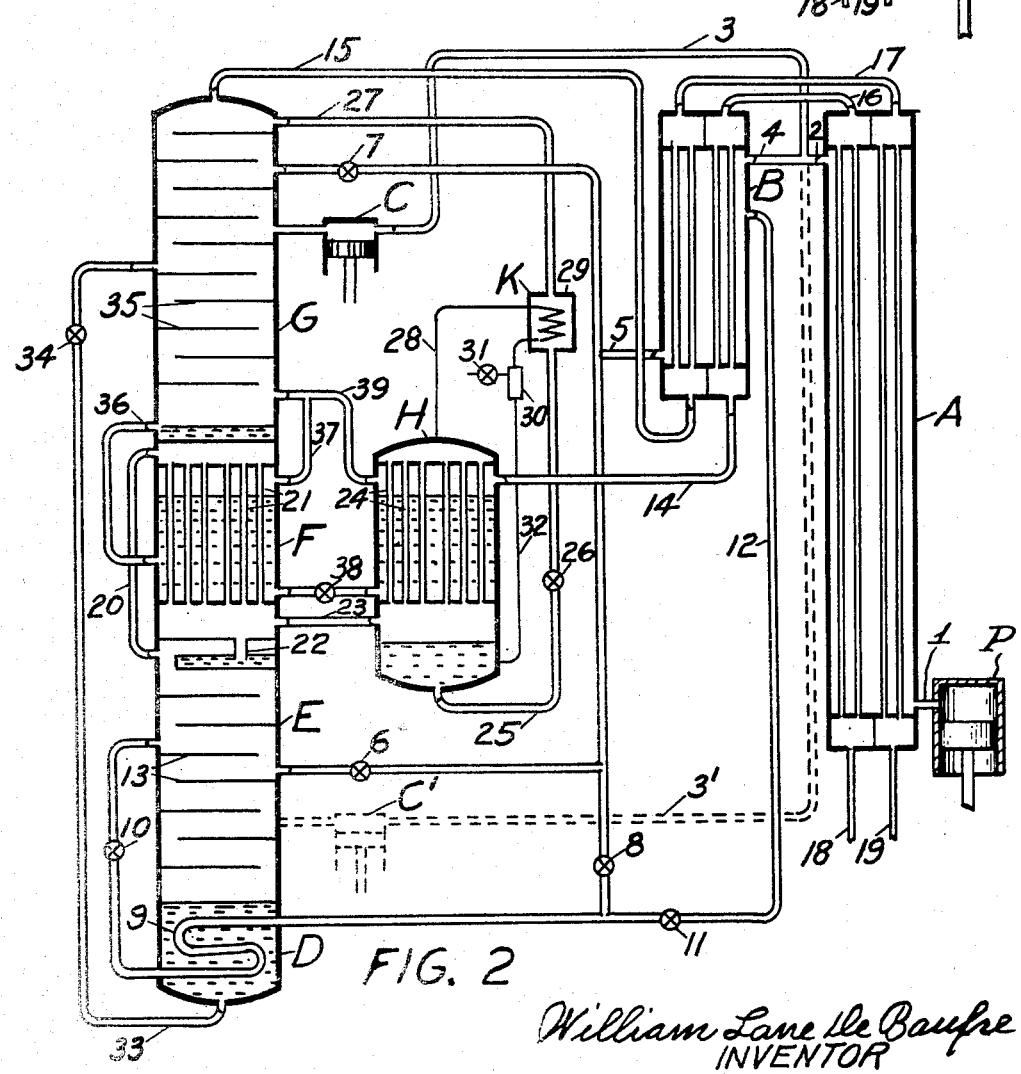

The foregoing, together with such other advantages as may hereinafter appear or are incident to the invention, are realized by the construction illustrated in preferred forms in the accompanying drawing, wherein Fig. 1 represents a single-stage rectification process and Fig. 2 represents a two-stage rectification process.

Referring to the drawing, a plant for separating air or other gaseous mixtures includes purification apparatus not shown and the following pieces of equipment shown on the drawing:

A compressor P for compressing the air or other gaseous mixture to a high pressure;

An interchanger A for cooling the compressed air or other gaseous mixture by heat interchange with returning products of rectification;

An exchanger B for further cooling a portion of the compressed air or other gaseous mixture by heat interchange with returning products of rectification;

An engine (or turbine) C (or C') for expanding another portion of the compressed air or other gaseous mixture with production of external work; and A rectification column operating under reduced pressure for separating the air or other gaseous mixture into more or less pure components.

The rectification column may consist of a vaporizer D with a single tray section E as shown in Fig. 1. Or, it may comprise a vaporizer D, a preliminary tray section E, a condenser F, a final tray section G, an exchanger H and a purifier K as shown in Fig. 2. In either case, the purpose of vaporizer D is to produce vapor reflux in the column by heat interchange with a portion of the compressed air or other gases before throttling into the column. In the latter case, the several parts of the rectification column function as follows:

Tray section E subjects the air or other mixed gases to a preliminary rectification under reduced pressure whereby the air or other mixed gases are separated into a liquid portion richer in one component than the original mixed gases and a vapor portion richer in another component.

Condenser F condenses part of the vapor portion from tray section E to form a liquid reflux for tray section E, by heat interchange with liquid from tray section G, thereby producing vapor reflux for tray section G.

Tray section G subjects the liquid portion from tray section E to a final rectification under a lower reduced pressure, whereby more or less pure oxygen and nitrogen are obtained from the original air or more nearly pure products of rectification are obtained from other gaseous mixtures.

Exchanger H condenses the remaining vapor portion from tray section E to form a liquid reflux for tray section G, by heat interchange with liquid from tray section G, the resulting vapor serving partly as reflux vapor for tray section G and partly as one product of the final rectification.

Purifier K purifies highly volatile gases in the vapor from tray section E not condensed within condenser F and exchanger H.

Tray sections E and G may have some construction equivalent to trays which will bring streams of rising vapor and downflowing liquid into intimate contact.

The arrangement and operation of the equipment above listed and shown on the drawing, will be described and explained for the separation of atmospheric air into more or less pure oxygen and nitrogen. The air to be separated must first be purified of most of the carbon dioxide and water vapor by apparatus not shown on the drawing. It must also be compressed to a pressure of say 15 to 30 atmospheres by compressor P before it enters interchanger A through pipe 1. As the compressed air flows up through interchanger A, it is cooled to say, minus 110 to 130 centigrade by returning products of rectification consisting of more or less pure oxygen and nitrogen. With certain gaseous mixtures other than atmospheric air, the preliminary cooling in interchanger A may be unnecessary.

The cooled compressed air leaving interchanger A through pipe 2 divides into two portions. One portion flows through pipe 3 (or 3') to engine C (or C') where the cooled compressed air is expanded with performance of external work to the reduced pressure within the rectification column. The expanded air is introduced directly into the rectification column whereby the back pressure on engine C (or C') is substantially equal to the pressure of rectification within the column, and the temperature of the expanded air entering the column is substantially the same as the temperature of the expanded air leaving the engine. In Fig. 1, the expanded air is introduced at an appropriate tray directly into the single tray section E, where the expanded air is subjected to rectification under the reduced pressure therein. In Fig. 2, the expanded air from engine C is introduced at an appropriate tray directly into tray section G where it is subjected to the final rectification under the reduced pressure therein. Or, in an alternative arrangement, the expanded air from engine C' is introduced at an appropriate tray directly into tray section E where it is subjected to the preliminary rectification under the reduced pressure therein.

Another portion of the cooled compressed air leaving interchanger A through pipe 2 flows through pipe 4 into exchanger B where it is further cooled by heat interchange with returning products of rectification. The further cooled compressed air leaves exchanger B through pipe 5 and may then be throttled into the rectification column. In Fig. 1, the further cooled compressed air may be throttled through valve 6 directly into tray section E. In Fig. 2, the further cooled compressed air may be throttled through valve 6 directly into preliminary tray section E or through valve 7 directly into final tray section G.

By opening valve 8, the further cooled compressed air leaving exchanger B through pipe 5 will flow through coiled tube 9 within vaporizer D before being throttled into the rectification column through valve 10. The compressed air flowing through coiled tube 9 is brought into heat interchange with liquid surrounding this tube from tray section E. Resulting vaporization of this liquid produces vapor reflux for tray section E.

With valve 8 closed and valve 11 open, the compressed air flowing through coiled tube 9 and producing vapor reflux for tray section E, will be withdrawn from exchanger B through pipe 12 from a point intermediate to inlet pipe 4 for the compressed gases entering exchanger B and outlet pipe 5 for the portion of the compressed gases withdrawn from exchanger B after being cooled by returning products of rectification. The temperature of the compressed air withdrawn from exchanger B through pipe 12 will therefore be higher than the temperature of the compressed air withdrawn through pipe 5.

There will also be a difference in composition of the portions of compressed air withdrawn from exchanger B through pipes 5 and 12. The compressed air withdrawn through pipe 5 will be more or less liquefied and will therefore be richer in oxygen than the original air due to selective liquefaction. The compressed air withdrawn through pipe 12 will be vapor more or less in phase equilibrium with the liquid withdrawn through pipe 5. The compressed air withdrawn through pipe 12 will therefore be richer in nitrogen than the original air. After being further cooled in coiled tube 9, the portion of the compressed air withdrawn from exchanger B through pipe 12 is throttled through valve 10 into tray section E at a higher level than the portion of the compressed air withdrawn from exchanger B through pipe 5 and throttled through valve 6 into tray section E.

The selective liquefaction in exchanger B enables a higher purity of nitrogen to be obtained in the single rectification column of Fig. 1 than would otherwise be possible because the liquid throttled through valve 10 into tray section E is richer in nitrogen than atmospheric air. The nitrogen product of rectification approaches phase equilibrium with this nitrogen-rich liquid rather than with liquid having the same percentage of nitrogen as atmospheric air.

The air entering tray section E as above described, is subjected to rectification through interaction of vapor flowing up and of liquid flowing down through trays 13 therein. Liquid from tray section E finally reaches vaporizer D where the liquid accumulates around coiled tube 9 and is vaporized by heat interchange with compressed air flowing through tube 9 as previously explained.

In the case of the single rectification column shown in Fig. 1, part of the vaporized liquid from vaporizer D forms one of the products of rectification and leaves the column through pipe 14. The other product of rectification leaves the top of the column through pipe 15. Both products return to exchanger B.

In the case of the double rectification column shown in Fig. 2, vapor flowing up through trays 13 within tray section E finally reaches the top of tray section E and leaves through pipe 20. Flowing through pipe 20, this vapor enters the compartment at the top of condenser F and flows down through tubes 21 therein where the vapor is partly condensed. The condensed portion flows through liquid seal 22 onto trays 13 within tray section E where it forms the liquid reflux for the preliminary rectification.

The remaining vapor flows through pipe 23 into exchanger H where it is condensed within tubes 24 with the exception of highly volatile gases such as neon and helium. The resulting liquid collects in the bottom of exchanger H and is withdrawn through pipe 25. This liquid is throttled through valve 26 and then flows through purifier K and pipe 27 to the top of tray section G where it forms a reflux liquid for the final rectification of the air within tray section G.

The highly volatile constituents of the mixed gases, such as neon and helium in atmospheric air leave exchanger H through pipe 28 and then flow through coiled tube 29 within purifier K. Here the highly volatile gases are purified by being further cooled, thereby liquefying some of the nitrogen therewith. The purified gases are separated from the liquefied nitrogen in separator 30 and are withdrawn through valve 31. The liquefied nitrogen returns to exchanger H through pipe 32.

The oxygen-rich liquid accumulating within vaporizer D as the result of the preliminary rectification of the mixed gases within tray section E is only partly vaporized by heat interchange with the mixed gases flowing through coiled tube 9. The remaining oxygen-rich liquid is withdrawn through pipe 33 and is throttled through valve 34 onto the trays within tray section G where it is subjected to a final rectification by interaction of vapor flowing up and of liquid flowing down through trays 35.

Liquid from tray section G flows through pipe 36 to the space surrounding tubes 21 within condenser F. Here the liquid from tray section G is partly vaporized by heat interchange with vapor from section E, the resulting vapor returning through pipe 37 to tray section G to form vapor reflux for the final rectification. The liquid not vaporized in condenser F flows through valve 38 to the space surrounding tubes 24 within exchanger H where vaporization of the liquid is completed. The resulting vapor leaves exchanger H, part through pipe 39 to augment the vapor reflux for the final rectification in tray section G and part through pipe 14 as one of the products of the final rectification returning to exchanger B. In the case of the rectification of air, this product of rectification is more or less pure oxygen.

The other products of the final rectification, which in the case of rectifying air is more or less pure nitrogen, leaves the top of tray section G through pipe 15 and returns to exchanger B.

The products of rectification entering exchanger B through pipes 14 and 15, flow through the tubes therein in heat interchange with a portion of the compressed air or other mixed gases surrounding these tubes. The products of rectification then leave exchanger B through pipes 16 and 17 and enter interchanger A. In returning through the tubes within interchanger A, the products of rectification are brought into heat interchange with the compressed air or other mixed gases surrounding these tubes. Finally, the products of rectification leave interchanger A through pipes 18 and 19.

The plant is cooled down to operating temperatures by the action of engine C (or C') in removing heat from the compressed air by the performance of external work. The cooled expanded air returns through the rectifying column and exchanger B and interchanger A. Liquid is accumulated on the trays within tray sections E and G by throttling cooled compressed air from exchanger B through valves 6 and 7. When liquids have been built up within vaporizer D and condenser F and exchanger H, the plant is ready for full operation.

During full operation, the various valves are operated to maintain conditions as constant as possible and obtain the desired purities of the products of rectification.

The purities of the products of rectification in any particular column depend upon the efficiency of the individual trays in bringing the liquid therein into phase equilibrium with the vapor bubbling up through the liquid and upon the number of trays and upon the distribution of the trays within the column. With a given column, the purities of the products also depend upon the amounts of vapor and liquid refluxes supplied to the trays and upon the purities of these refluxes. Any increase in the amounts or purities of the refluxes produces an increase in the purities of the products.

The amounts of the refluxes in the columns shown in the drawing, can be increased by increasing the heat supplied to the liquid within vaporizer D from the cooled compressed air flowing through coiled tube 9. The heat transfer is increased by opening wider valve 10 thereby increasing the rate of flow of cooled compressed air through coiled tube 9. This is true whether the cooled compressed air is supplied from exchanger B through valve 8 or through valve 11 or through both valves together. When supplied through valve 11 only the nitrogen product of rectification is purer than when supplied through valve 8 because the reflux in the former case contains a higher percentage of nitrogen as previously explained.

In any double rectification system as shown in Fig. 2, the amount of vapor reflux in the preliminary tray section can be increased by increasing the heat supplied to the liquid within vaporizer D from the cooled compressed air flowing through coiled tube 9 as in the case of single rectification shown in Fig. 1. If the total quantity of air processed remains constant, any increase in the compressed air flowing through coiled tube 9 and throttled into the column through valve 10 results in a corresponding decrease in the air expanded through engine C or otherwise entering the column. Consequently, the effect of increasing the amount of vapor reflux in the preliminary tray section is felt throughout the column with an increase in purity of one or both products of the final rectification. The relative proportions of the vapor from preliminary tray section E that are condensed in condenser F and exchanger H should be determined in designing the column in accordance with the heating effect expected in vaporizer D.

What I claim is:

1. A method of separating compressed mixed gases, which includes subjecting the mixed gases to rectification under reduced pressure, expanding a portion of the compressed mixed gases with performance of external work to said reduced pressure and then subjecting said portion to said rectification, subjecting a second portion of the compressed mixed gases to selective liquefaction by heat exchange with returning products of rectification whereby a vapor portion is obtained richer in one component than the mixed gases, producing vapor reflux for said rectification by vaporizing liquid from said rectification in liquefying said vapor portion, and utilizing the resulting liquid as a liquid reflux in said rectification.

2. Apparatus for separating compressed mixed gases by rectification including an expander for expanding one portion of the compressed mixed gases with performance of external work to a lower temperature and pressure, a column for rectifying the expanded portion of said mixed gases, means for introducing said expanded portion into said column at said lower temperature and pressure, an exchanger for selectively liquefying another portion of the cooled compressed mixed gases by heat exchange with returning products of rectification whereby a vapor portion is obtained richer in one component than the mixed gases, a vaporizer for vaporizing liquid from said column in liquefying said vapor portion, and means for throttling the resulting liquid into said column.

3. A method of separating compressed mixed gases by rectification which includes cooling said compressed mixed gases by heat exchange with returning products of rectification, subsequently dividing the cooled compressed mixed gases into two portions, expanding one portion of the cooled compressed mixed gases with performance of external work to a lower temperature and pressure and then subjecting the expanded portion at said lower temperature and pressure to rectification, subjecting another portion of the cooled compressed mixed gases to selective liquefaction by heat exchange with returning products of rectification whereby a vapor portion is obtained richer in one component than the mixed gases, producing vapor reflux for said rectification by vaporizing liquid from said rectification in liquefying said vapor portion, and utilizing the resulting liquid as a liquid reflux in said rectification.

4. Apparatus for separating compressed mixed gases by rectification, including an interchanger for cooling said compressed mixed gases by heat exchange with returning products of rectification, means for subsequently dividing the cooled compressed mixed gases into two portions, an expander for expanding one portion of the compressed mixed gases with performance of external work to a lower temperature and pressure, a column for rectifying the expanded portion of said mixed gases, means for introducing said expanded portion into said column at said lower temperature and pressure, an exchanger for selectively liquefying another portion of the cooled compressed mixed gases by heat exchange with returning products of rectification whereby a vapor portion is obtained richer in one component than the mixed gases, a vaporizer for vaporizing liquid from said column in liquefying said vapor portion, and means for throttling the resulting liquid into said column.

5. Method of separating compressed mixed gases, which includes subjecting the mixed gases to a preliminary and a final rectification at reduced pressures, producing liquid reflux for said preliminary rectification and liquid and vapor refluxes for said final rectification by heat interchange between vapor from said preliminary rectification and liquid from said final rectification, expanding a portion of the compressed mixed gases with performance of external work to a lower temperature and pressure and then subjecting said portion at said lower temperature and pressure to said final rectification, producing vapor reflux for said preliminary rectification by vaporizing liquid from said preliminary rectification in cooling a second portion of the compressed mixed gases, throttling said second portion to the reduced pressure of said preliminary rectification and then subjecting said second portion to said preliminary rectification.

6. Method of separating compressed mixed gases, which includes subjecting the mixed gases to a preliminary and a final rectification at reduced pressures, producing liquid reflux for said preliminary rectification and liquid and vapor refluxes for said final rectification by heat interchange between vapor from said preliminary rectification and liquid from said final rectification, expanding a portion of the compressed mixed gases with performance of external work to a lower temperature and pressure and then subjecting said portion at said lower temperature and pressure to said final rectification, cooling a second portion of the compressed mixed gases by heat interchange with products of said final rectification, producing vapor reflux for said preliminary rectification by vaporizing liquid from said preliminary rectification in further cooling said portion, throttling said second portion to the reduced pressure of said preliminary rectification and then subjecting said second portion to said preliminary rectification.

7. Method of separating compressed mixed gases by rectification which includes cooling said compressed mixed gases by heat exchange with returning products of rectification, subsequently dividing the cooled compressed mixed gases into two portions, expanding one portion of the cooled compressed mixed gases with performance of external work to a lower temperature and pressure and then subjecting the expanded portion at said lower temperature and pressure to rectification under the successive actions of two liquid refluxes formed by a preliminary rectification of another portion of the cooled compressed mixed gases, the liquid reflux last in contact with the expanded portion undergoing rectification being richer in the more volatile component of the mixed gases than the liquid reflux first in contact with said expanded portion.

8. Apparatus for separating compressed mixed gases by rectification, including an interchanger for cooling said compressed mixed gases by heat exchange with returning products of rectification, means for subsequently dividing the cooled compressed mixed gases into two portions, an expander for expanding one portion of the compressed mixed gases with performance of external work to a lower temperature and pressure, a column for rectifying the expanded portion of said mixed gases, means for introducing said expanded portion into said column at said lower temperature and pressure, means for further cooling another portion of said compressed mixed gases by heat exchange with returning products of rectification, means for subsequently subjecting the further cooled portion to a preliminary rectification and for dividing this portion into a liquid richer in the less volatile component of the mixed gases and a vapor richer in the more volatile component, means for liquefying said vapor, and means for introducing both liquids into said column as reflux liquids in rectifying the expanded portion of said mixed gases, the liquid richer in the more volatile component being introduced nearer the top of the column than the other liquid.

9. A method of separating compressed mixed gases, which includes subjecting the mixed gases to a preliminary and a final rectification at reduced pressures, producing liquid reflux for said preliminary rectification and liquid and vapor refluxes for said final rectification by heat interchange between vapor from said preliminary rectification and liquid from said final rectification, expanding a portion of the compressed mixed gases with performance of external work to the reduced pressure of said final rectification and then directly subjecting said portion to said final rectification, cooling a second portion of the compressed mixed gases by heat interchange with products of said final rectification, throttling said second portion to the reduced pressure of said preliminary rectification and then subjecting said second portion to said preliminary rectification, producing vapor reflux for said preliminary rectification by vaporizing liquid from said preliminary rectification in cooling a third portion of the compressed mixed gases, throttling said third portion to the reduced pressure of said preliminary rectification and then subjecting said third portion to said preliminary rectification.

10. An apparatus for separating compressed mixed gases by rectification, including a column for rectifying the mixed gases under reduced pressure, an engine for expanding a portion of the compressed mixed gases with performance of external work to said reduced pressure, means for introducing the expanded gases directly into said column, an exchanger for cooling a second portion of the compressed mixed gases by heat interchange with products of rectification from said column, means for throttling said second portion into said column, means for producing vapor reflux within said column by vaporizing liquid from said column in cooling a third portion of the compressed mixed gases, and means for throttling said third portion into said column, wherein said third portion of the compressed mixed gases is withdrawn from said exchanger intermediate to the inlet for said compressed mixed gases and the outlet for said second portion of the compressed mixed gases.

11. An apparatus for separating compressed mixed gases by rectification, including a column for rectifying the mixed gases having preliminary and final tray sections, means for producing liquid and vapor refluxes within said tray sections by heat interchange between vapor from said preliminary tray section and liquid from said final tray section, an engine for expanding a portion of the compressed mixed gases with performance of external work to a lower temperature and pressure, means for introducing the expanded gases at said lower temperature and pressure directly into said final tray section whereby the back pressure on said engine is substantially equal to the pressure within said final tray section, means for producing vapor reflux within said preliminary tray section by vaporizing liquid from said preliminary tray section in cooling a second portion of the compressed mixed gases, and means for throttling said second portion into said preliminary tray section.

12. An apparatus for separating compressed mixed gases by rectification, including a column for rectifying the mixed gases having preliminary and final tray sections, means for producing liquid and vapor refluxes within said tray sections by heat interchange between vapor from said preliminary tray section and liquid from said final tray section, an engine for expanding a portion of the compressed mixed gases with performance of external work to a lower temperature and pressure, means for introducing the expanded gases at said lower temperature and pressure directly into said final tray section whereby the back pressure on said engine is substantially equal to the pressure within said final tray section, an exchanger for cooling a second portion of the compressed mixed gases by heat interchange with products of rectification from said column, means for producing vapor reflux within said preliminary tray section by vaporizing liquid from said preliminary tray section in further cooling said second portion, and means for throttling said second portion into said preliminary tray section.

13. An apparatus for separating compressed mixed gases by rectification, including a column for rectifying the mixed gases having preliminary and final tray sections, means for producing liquid and vapor refluxes within said tray sections by heat interchange between vapor from said preliminary tray section and liquid from said final tray section, an engine for expanding a portion of the compressed mixed gases with performance of external work to a lower temperature and pressure, means for introducing the expanded gases at said lower temperature and pressure directly into said final tray section whereby the back pressure on said engine is substantially equal to the pressure within said final tray section, an exchanger for cooling a second portion of the compressed mixed gases by heat interchange with products of rectification from said column, means for throttling said second portion into said column, means for producing vapor reflux within said preliminary tray section by vaporizing liquid from said preliminary tray section in cooling a third portion of the compressed mixed gases, and means for throttling said third portion into said preliminary tray section.

WILLIAM LANE DE BAUFRE.